C. W. BOYNTON.
Drying-Kiln.

No. 213,542. Patented Mar. 25, 1879.

WITNESSES.
Arthur G. Morey
William R. Manlove

INVENTOR.
Charles W. Boynton
by G. L. Chapin
Atty.

C. W. BOYNTON.
Drying-Kiln.
No. 213,542. Patented Mar. 25, 1879.
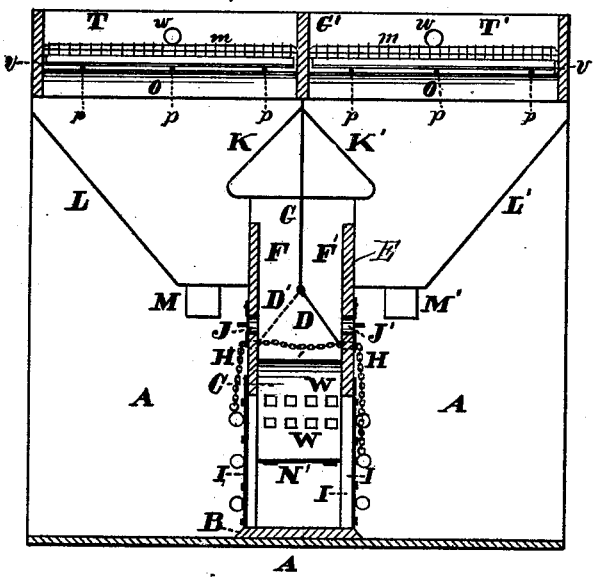
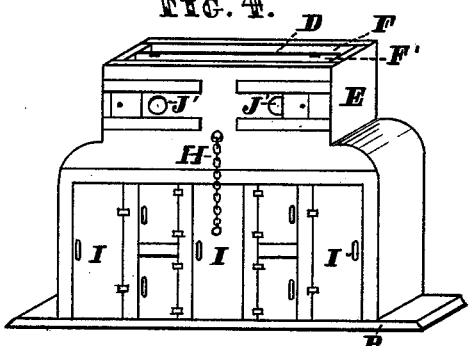
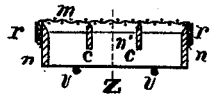
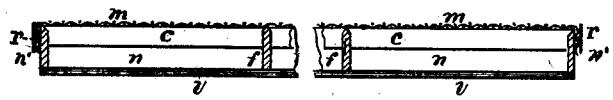
WITNESSES.
Arthur G. Morey
William R. Manlove
INVENTOR.
Charles W. Boynton.
by G. L. Chapin.
Atty

UNITED STATES PATENT OFFICE.

CHARLES W. BOYNTON, OF CHICAGO, ILLINOIS.

IMPROVEMENT IN DRYING-KILNS.

Specification forming part of Letters Patent No. 213,542, dated March 25, 1879; application filed November 21, 1878.

*To all whom it may concern:*

Be it known that I, CHARLES W. BOYNTON, of Chicago, in the county of Cook and State of Illinois, have invented a new and useful Improvement in Grain-Drying Kilns, of which the following is a specification, reference being had to the accompanying drawings, illustrating the improvement and forming a part of this specification.

The present invention relates to an improvement in kilns for drying grain, malt, and other material, but more especially for drying malt.

The nature of the invention consists, first, in a principal air-flue, combined with two single air-flues, with a cut-off between them, and leading to separate drying-floors, the said flues being protected from grain coming from the floors into the hopper surrounding the flues by means of a deflector. The object attained by this construction of flues and cut-off is the discharge of hot air and gases from the furnaces into either or both parts of a two-part hopper beneath the drying-floor, so that when grain or malt contained on one half of the floor is to be dumped into its respective part of the hopper below, the hot air and gases from the furnaces may be excluded and cold air admitted, to permit laborers to enter the drying-room. Second, in combination with the main air-flue and its branches and the two-part floor and hopper, one or more furnaces, having side openings communicating with the main air-flue, whereby the heat is prevented from escaping until supplied with a proper amount of atmospheric air.

Figure 1:
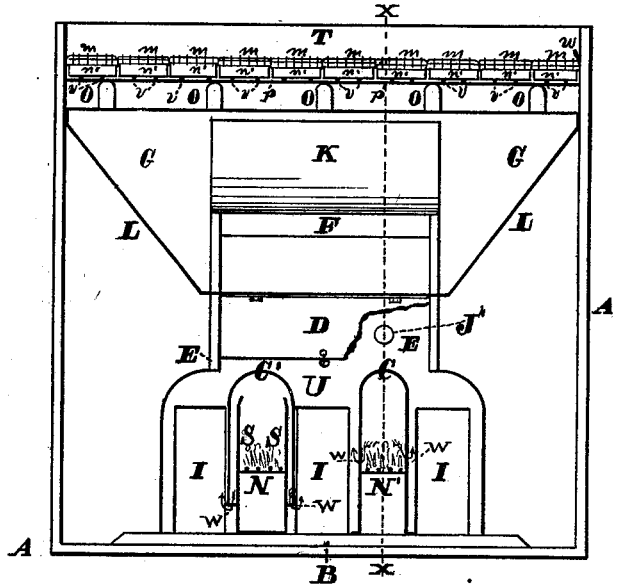
Figure 2:
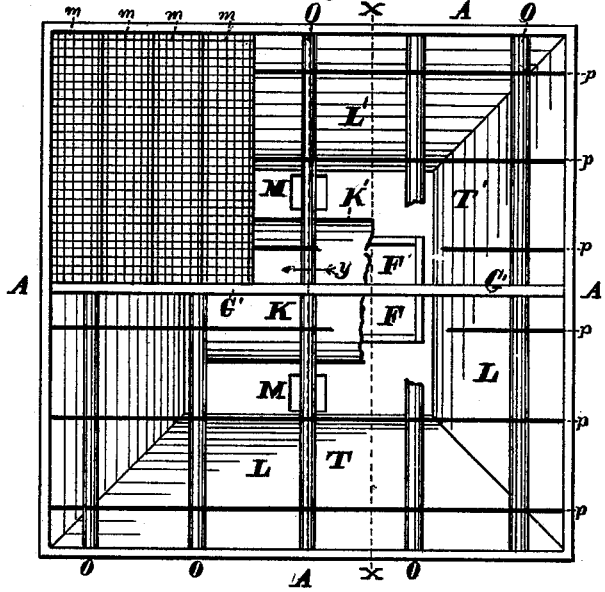

In the drawings, Figure 1 is an elevation of a drying-kiln embodying my improvements, with the front of the building, front of the furnaces, front of the main air-flue, and front of hopper removed. Fig. 2 is a top or plan view of the apparatus, with the larger portion of the sectional drying-room floor removed to show the construction below; Fig. 3, a sectional elevation taken on line $x$, viewed in the direction of dart $y$, Fig. 2; Fig. 4, a perspective view of the furnaces and case, and lower parts of flues and their attached parts, all being removed from the building; Fig. 5, a transverse section of one of the sections forming the drying-floor. Fig. 6 is a broken longitudinal section of Fig. 5, taken on line $z$, Fig. 5.

A represents the building or exterior part of a drying-kiln inclosing my improvements.

The foundation B of the furnaces is to be of any ordinary construction for that purpose. The furnace C has a semicircular dome, terminating in vertical sides, and is provided with the ordinary grate N'; but instead of having openings at the top for the escape of heat and gases, it is provided with side openings, W, Fig. 3, for the escape of hot air and gases into an enlarged chamber, U, where cold air comes in contact with the gases from the furnaces, and tempers or properly modifies the heat which is to come in contact with the grain or malt on the drying-floors. The cold air last mentioned is admitted to the interior of the enlarged chamber U by means of the doors I.

The furnace S S is provided with a hood, C', which extends down to below the fuel on the grate N, to prevent the upward escape of heat until it is brought in contact with a proper quantity of cold air for the purpose stated. In some localities, and by the use of some kinds of coal, the hood C' is required to bring the heated gases down lower than the holes W before escaping, in order that a better supply of atmospheric air be attained; but under other circumstances the furnace C will answer the purpose; but in any event the hot gases should escape at the sides of the furnaces, and into a chamber at those places, and commingle with all the oxygen they will retain without deadening the fire in the furnaces. This will be the guide for the operation in admitting air to them. When this is done anthracite coal can be used to produce combustion, and the products thereof admitted freely to the grain on the drying-floors without injuring it; and at the same time a heat is attained fully sufficient to dry all ordinary substances in a manner superior to any process now known to the art for that purpose. The distinction in my invention in this regard is, that the ordinary anthracite-coal furnaces eliminate the products of combustion from one open end or at a flue at the top in such a body that oxygen cannot properly commingle with it.

My process is to use the maximum quantity of atmospheric air with the coal-gases. To effectually utilize the coal-gases and oxygen, the air-chambers at the sides of the furnaces should be each of a width corresponding to about one-third of the length of the furnaces, so that sufficient oxygen may come in contact with the fire-jets at the middle parts of the furnaces. Chambers of less size at the sides of the furnaces will operate; but experience proves that a considerable body of air is required to attain the best effects.

I am aware that the commingling of atmospheric air with coal-gases for drying purposes is old; but in drying-kilns I am not aware that air and coal-gas have been combined at the place and by the means herein shown.

I am also aware that it is old to supply air directly to burning coal. I therefore confine myself substantially to the construction shown.

The main flue E, above the furnaces is, as shown at Figs. 1 and 4, narrower than the furnace-chamber U. It may be the same width; but for economy it is made as shown. This flue E extends up to deflector K K', which keeps the grain from getting into the flue in its descent to the hopper L L'. G represents a partition in the upper part of flue E, that gases and air may pass into either part of the two-part hopper L L'; and that heat may be excluded wholly from either part of the hopper, the partition G extends entirely across the hopper, as shown in Fig. 1. Cold air may be conducted into either part of the two-part hopper by means of the cold-air pipes J J', which communicate with the main flue and the interior of the kiln, so that cold air can be admitted to or shut off from either part of the hopper, and consequently admitted or shut off from either drying-room above.

A valve, D, Figs. 1, 3, and 4, of a size to close either of the branch flues F F', is hung to the partition G, and a chain, H, is attached to it, for the convenience of operating it at the front or rear of the furnaces. The partition G unites with the partition G', which separates the two drying-chambers. Over the hopper L L' are placed girders O, for the main support of the drying-floor; and transversely across these girders are placed ribs p, on which the trays m m, &c., are transversely placed.

The trays are constructed as follows: Each tray consists of a substantial longitudinal frame, n n', n being the sides and n' the ends thereof.

Transversely across and between the sides n of the trays are placed bearers f, at such distance apart as to assist in supporting wire-cloth m above; and longitudinally between the ends n' are placed bearers c c, which are gained into the bearers f f, to form a floor of suitable strength to support the grain or malt to be dried, and also persons who are to work thereon. The wire-cloth should be of such mesh as to allow a free passage of air, and not to let the grain through.

The wire is brought over the sides and ends of the frames n n', and, when the frames are of wood, secured by screws, staples, or nails. If plates r of metal be secured to sides and ends of the frame, where the wire-cloth is brought over them, the plates will prevent the wire from being detached by use. The upper edges of all parts of the tray coming in contact with the wire should be made thin, so as not to obstruct the passage of air and gases.

Longitudinally to the under side of the trays, and at about one-quarter of the distance in from the sides, are secured bearers v v, which are fixtures to the trays, and serve more especially as bearings, on which the tray may be more readily dumped, inasmuch as the bearers support the tray more centrally than if the tray had bearings its entire width on the ribs p. The trays so made are to be long enough to extend across the drying-room, the length of the room determining the number of trays to be used.

For convenience, the width of the trays should not exceed twenty inches or two feet, and should fit so closely together as to prevent grain from falling through between them.

It is sometimes desirable to dump the contents of an upper floor into a lower floor, and thus utilize the heat on two or more sets of floors. In this case the height of the building would have to be increased to give room for the duplicate floors.

The meshes of the wire should decrease in size on each sub-floor, as the grain or malt shrinks in drying.

The furnaces are provided with doors, as shown in Figs. 3 and 4, by means of which coal can be supplied to the furnaces.

The process is as follows: The substance to be dried is spread on the trays at m, which trays are to cover the area over hopper L L', and the valve D is to have a vertical position, so as to admit gases and air through the branches F F' of the flue E to dry the grain on the trays m m, &c.

When grain or malt on one side of the partition G'—as, for instance, in room T'—is dried, the valve D is brought to one side of the flue E, as shown at Fig. 3, to shut the gases off from that room. Cold-air inlet J' is then opened and room T' cooled for workmen to enter and dump the trays m, one by one, till its contents are discharged into the hopper at L'.

The drying process continuing in the opposite compartment T, the contents of the other floor are discharged in the same manner after bringing the valve D to dotted lines D', Fig. 3. The malt or grain is to be taken from the hoppers by means of spouts M M'.

I claim—

1. One or more furnaces, S S and C, combined with the air-chambers U, main flue E and its branches F F', hopper L L', and deflector K, as and for the purpose specified.

2. The two-part drying-room T T', two-part hopper L L', two-part flue E F F', cold-air drafts J J', cut off D, and furnaces S S C, whereby the drying process is continued in one drying-room while the other is being emptied, as specified.

CHARLES W. BOYNTON.

Witnesses:
G. L. CHAPIN,
A. G. MOREY.